United States Patent [19]

Ogawa

[11] Patent Number: 4,551,764
[45] Date of Patent: Nov. 5, 1985

[54] VIDEO CAMERA

[75] Inventor: Kimiaki Ogawa, Tokyo, Japan

[73] Assignee: Asahi Kogaku Kogyo Kabushiki Kaisha, Tokyo, Japan

[21] Appl. No.: 563,483

[22] Filed: Dec. 20, 1983

[30] Foreign Application Priority Data

Dec. 20, 1982 [JP] Japan ................................ 57-223544
Dec. 20, 1982 [JP] Japan ................................ 57-223545

[51] Int. Cl.⁴ ............................................. G01J 1/42
[52] U.S. Cl. .................................. 358/228; 358/225; 352/137
[58] Field of Search ............... 358/228, 225, 335, 906; 354/286, 422, 435, 271.1, 234.1, 436–440, 446, 451, 452, 453, 230; 352/137

[56] References Cited

U.S. PATENT DOCUMENTS

| 3,526,176 | 9/1970 | Hackenberg | 354/453 |
| 3,592,116 | 7/1971 | Ritze | 354/451 |
| 3,705,764 | 12/1972 | Reinsch | 352/137 |
| 3,955,866 | 5/1976 | Suzuki | 352/137 |
| 3,988,749 | 10/1976 | Frode et al. | 354/451 |

Primary Examiner—Gene Z. Rubinson
Assistant Examiner—Stephen Brinich
Attorney, Agent, or Firm—Sughrue, Mion, Zinn Macpeak & Seas

[57] ABSTRACT

A video camera capable of taking both still pictures and moving pictures yet having a size and weight substantially the same as a conventional video camera. The automatic aperture of the video camera is used as an aperture and shutter for still picture photographing operations. The lens body has a programmed exposure time control circuit for producing an exposure time control signal, while the camera body has a still control circuit for producing a still control signal which marks the start and finish of a still picture photographing operation. The camera body and lens body are provided with respective first and second signal control circuits for controlling the flow of a bidirectional signal, which is a composite of the exposure time control signal and still control signal. The bidirectional signal is passed between the camera body and the lens body over a single signal line in a time division manner during still picture photographing operations.

5 Claims, 7 Drawing Figures

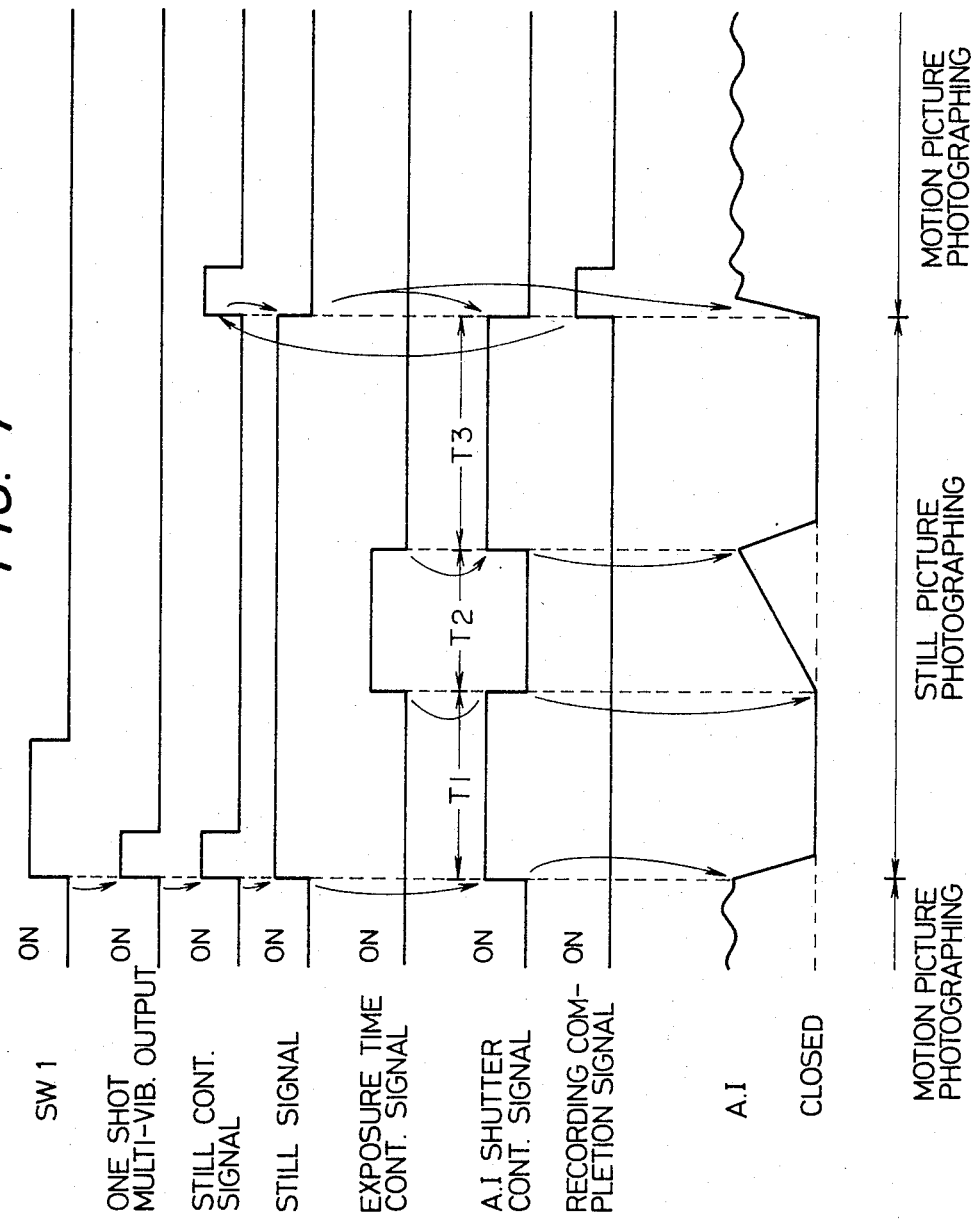

VIDEO CAMERA

BACKGROUND OF THE INVENTION

The present invention relates to a video camera in which an automatic aperture used for continuously photographing scenes of changing conditions performs as an aperture and shutter for still picture photographing operations so that still pictures can be taken with various exposure times.

An example of a conventional video camera is shown in FIG. 1. A lens body L is provided with an automatic aperture 10 and an automatic aperture drive circuit 20, and a camera body B is provided with an automatic aperture control circuit 30 and a recording control/drive circuit 40. The automatic aperture 10 is used as an aperture and shutter during still picture photographing operations.

For continuous photographing, the video camera takes a picture every 1/60 sec or 1/30 sec. The pictures thus taken can be seen as a motion image when displayed continuously.

This conventional video camera cannot take still pictures with various exposure times. However, in the conventional video camera, the shutter speed is fixed, 1/60 sec or 1/30 sec, and the video camera cannot take still pictures with shutter speeds other than those. This difficulty may be overcome by providing a video camera by combining the above-described conventional video camera and a still camera. However, this approach suffers from drawbacks in that the camera thus formed is large in size and weight, and its operation is complex.

In view of the foregoing, an object of the present invention is to provide a video camera which can take still pictures with a variety of exposure times, which is substantially equal in size and weight to a conventional video camera, and wihich can be operated easily. Yet another object of the invention is to make the number of signal lines extending between the lens body and camera body of such a video camera as small as possible.

SUMMARY OF THE INVENTION

The foregoing objects of the invention have been achieved by the provision of a video camera capable of taking still pictures, in which a lens body of the camera is provided with an automatic aperture and is separable from the camera body. The automatic aperture is used as an aperture and shutter during still picture photographing operations. The lens body has a programmed exposure time control circuit for producing an exposure time control signal, and the camera body has a still control circuit for producing a still control signal which marks the start and finish of a still picture photographing operation. The camera body and the lens body are further provided with a first signal control circuit and a second signal control circuit, respectively, which are adapted to control the flow of a bidirectional signal consisting of the exposure time control signal and still control signal. The bidirectional signal is passed through a single signal line in time division manner during still picture photographing operations.

BRIEF DESCRIPTION OF THE DRAWINGS

FIG. 7 is a timing diagram corresponding to the video camera shown in FIG. 6.

DESCRIPTION OF THE PREFERRED EMBODIMENTS

Figure 1:
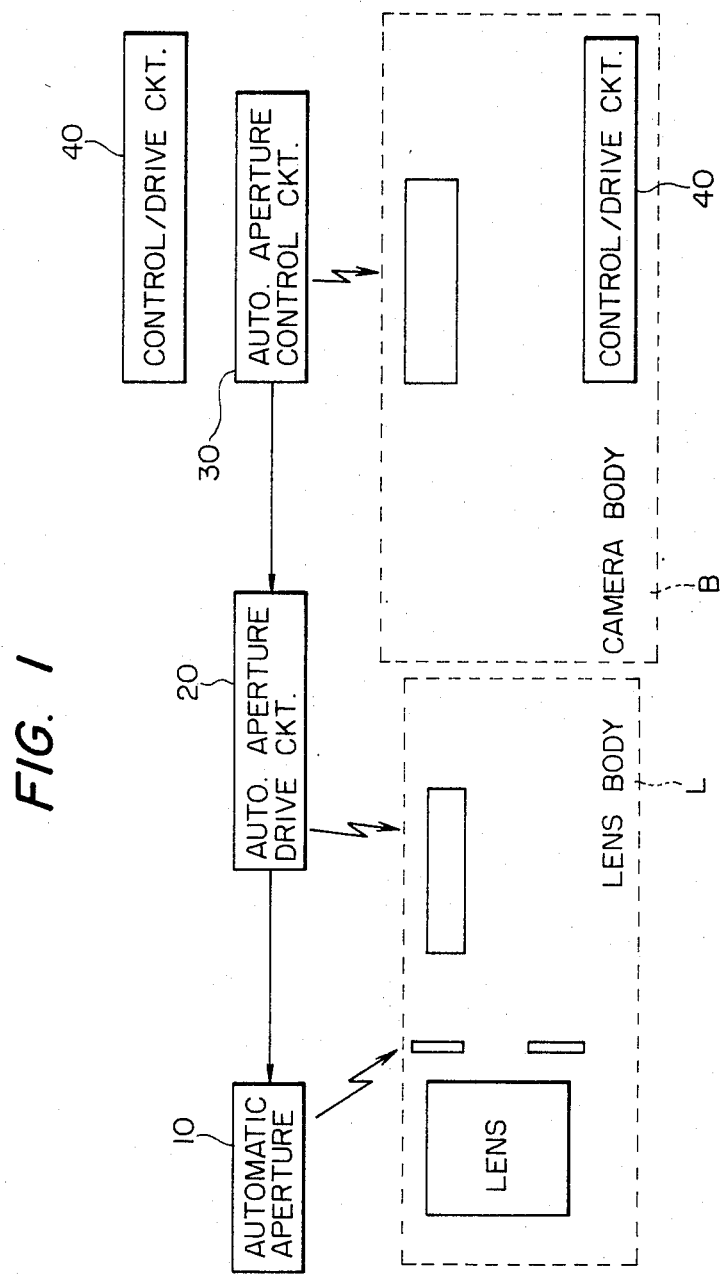
FIG. 1 is a block diagram showing portions of a conventional video camera.

The invention will now be described with reference to a first preferred embodiments shown in FIGS. 2 through 4. In these figures, those components which have been described with reference to FIG. 1 are designated by the same reference numerals or characters.

Figure 2:
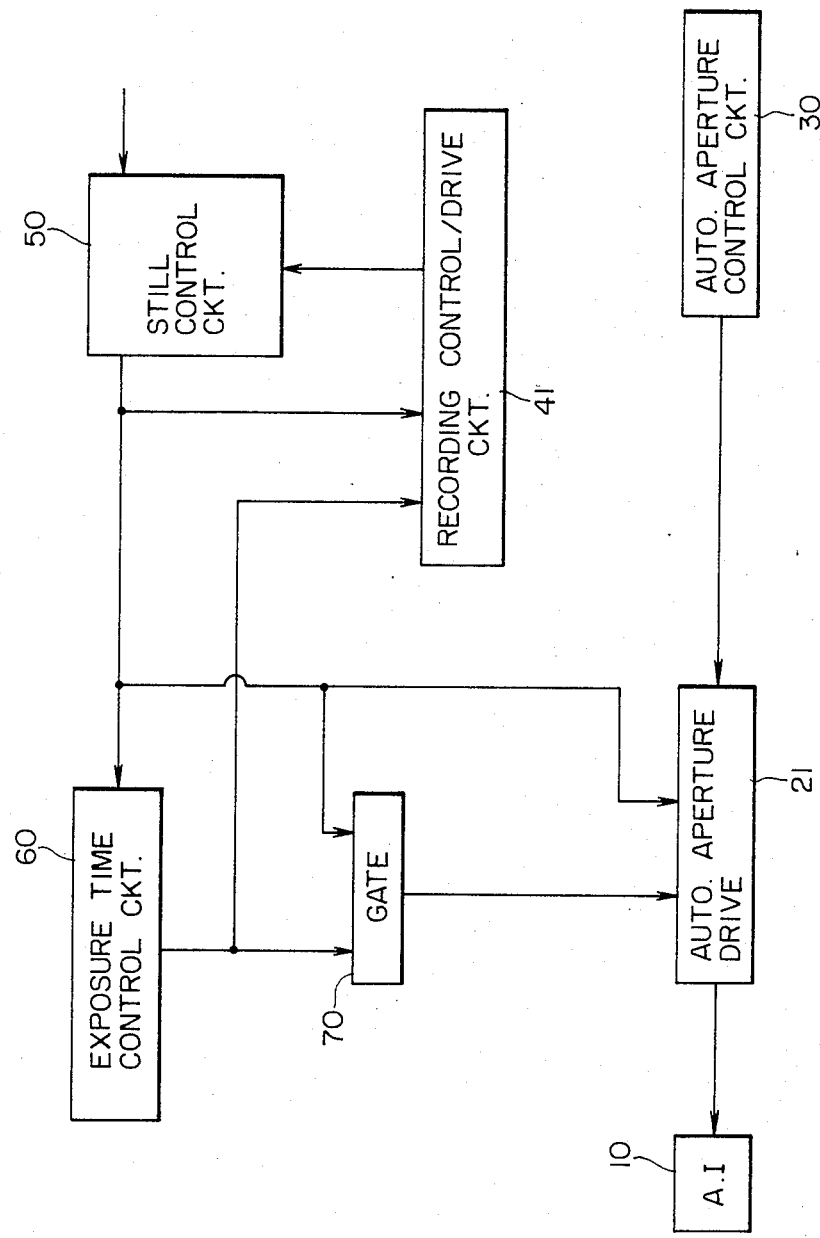
FIG. 2 is a block diagram showing a portion of a video camera constructed in accordance with the invention.

FIG. 2 is a block diagram showing a first embodiment of the invention.

A still control circuit 50 outputs a still signal for a predetermined period of time after it receives a still trigger signal. The still trigger signal indicates that the camera is in a still picture photographing state. A programmed exposure time control circuit 60 detects the quantity of light from the photographing field and calculates the most suitable exposure, providing a signal (hereinafter referred to as "an exposure time control signal" when applicable) accordingly which represents the automatic aperture exposure time. A gate circuit 70 receives the exposure time control signal and the still signal, and from them generates an automatic aperture shutter control signal for controlling the opening and closing of the automatic aperture. The automatic aperture shutter control signal is applied to an automatic aperture drive circuit 21 to operate the automatic aperture 10. More specifically, the automatic aperture 10 is closed for a predetermined period of time from the time instant that the still signal is generated and then opened for the programmed expiosure time, after which it again closed for a predetermined period of time.

In a recording control/drive circuit 41, a photographing signal, which is provided when the automatic aperture 10 is opened during still picture photographing operations as described above, is recorded on a recording medium. After a time sufficient to accomplish recording has passed, the circuit 41 applies a recording completion signal to the still control circuit 50.

Figure 3:
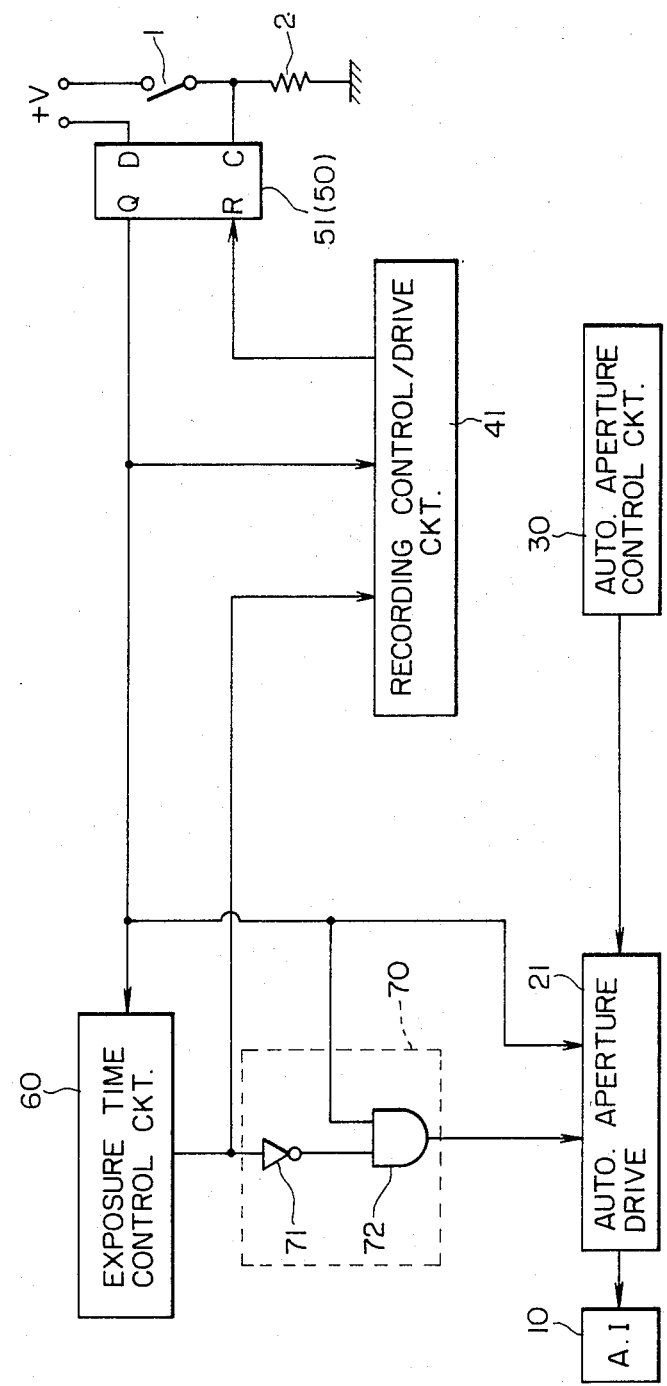
FIG. 3 is a block diagram showing a specific implementation of the video camera of FIG. 2.
Figure 4:
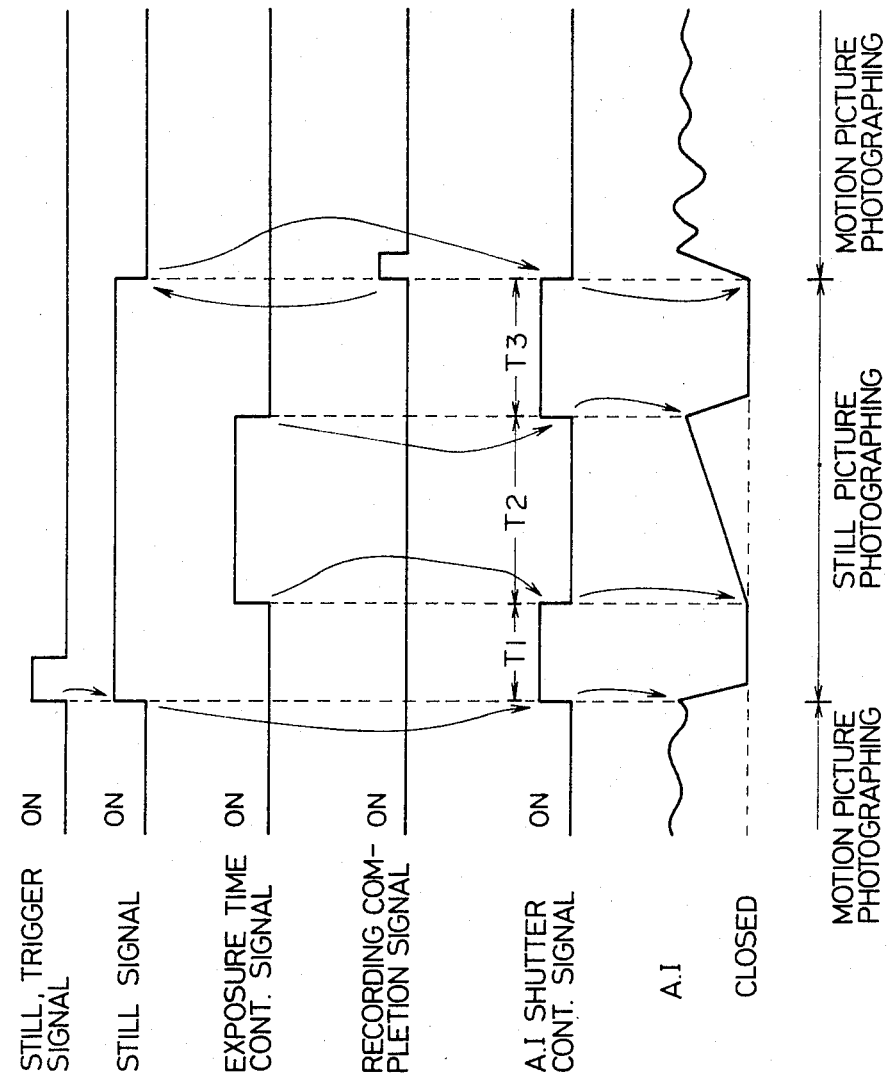
FIG. 4 is a timing diagram for the video camera of FIG. 3.

FIG. 3 is a block diagram showing the preferred embodiment of the invention in FIG. 2 in more detail. The still control circuit 50 is implemented with a D-type flip-flop 51. The clock terminal of the flip-flop 51 is connected to the connecting point of a resistor 2 and a switch 1 (operated in association with the release button) which is turned on at an initiation of still picture photographing operations. The still signal is provided at the Q output teminal of the flip-flop 51. The R (reset) terminal of the flip-flop 51 receives the recording completion signal.

The gate circuit 70 is implemented with an inverter 71 and an AND gate 72. The inverter 71 operates to invert the state of the exposure time control signal. The AND gate 72 receives the output signal of the inverter 71 and the still signal.

The operation of the circuit thus constructed will be described with reference to a timing chart shown in FIG. 4. When the switch 1 is open, no still signal is produced, and the AND gate 72 provides no output. Therefore, the automatic aperture drive circuit 21 is controlled only by the output signal of the automatic aperture control circuit 30, thus permitting motion picture photographing operations.

When the switch 1 is turned on, the still trigger signal is produced so that the still signal is provided at the Q output terminal of the flip-flop 51. Upon an application of the still signal to the automatic aperture drive circuit 21, the circuit 21 is controlled by the output signal of an automatic aperture control circuit 30 only. The programmed exposure time control circuit 60 provides no output for a predetermined period of time T1 from the time instant that it receives the still signal. Therefore, the inverter 71 provides an active output for the period of time T1. That is, the automatic aperture shutter control signal is outputted for the period of time T1, and thus the automatic aperture 10 is closed by the automatic aperture drive circuit 21 for the period of time T1.

For a period of time T2 commencing following the period of time T1, the exposure time control circuit 60 provides an active output, and therefore the AND gate 72 provides no output. Accordingly, the automatic aperture 10 is opened from the start of the period of time T2. The length of the period of time T2 is determined by the quantity of light received from the photographing field.

Following the period of time T2, the exposure time control signal goes to its inactive state. Therefore, as in the case of the period of time T1, the automatic aperture shutter control signal is outputted for a period of time T3. The automatic aperture 10 is then closed quickly, and it is maintained closed for the period of time T3. During the period of time T3, the still picture video signal is recorded on the recording medium. When the period of time T3 has passed, the recording control/drive circuit 41 outputs the recording completion signal, whereupon the still signal is placed in its inactive state and the picture photographing mode of the video camera is switched over to the motion picture photographing mode. The automatic aperture 10 is then controlled by the automatic aperture control circuit 30.

Figure 5:
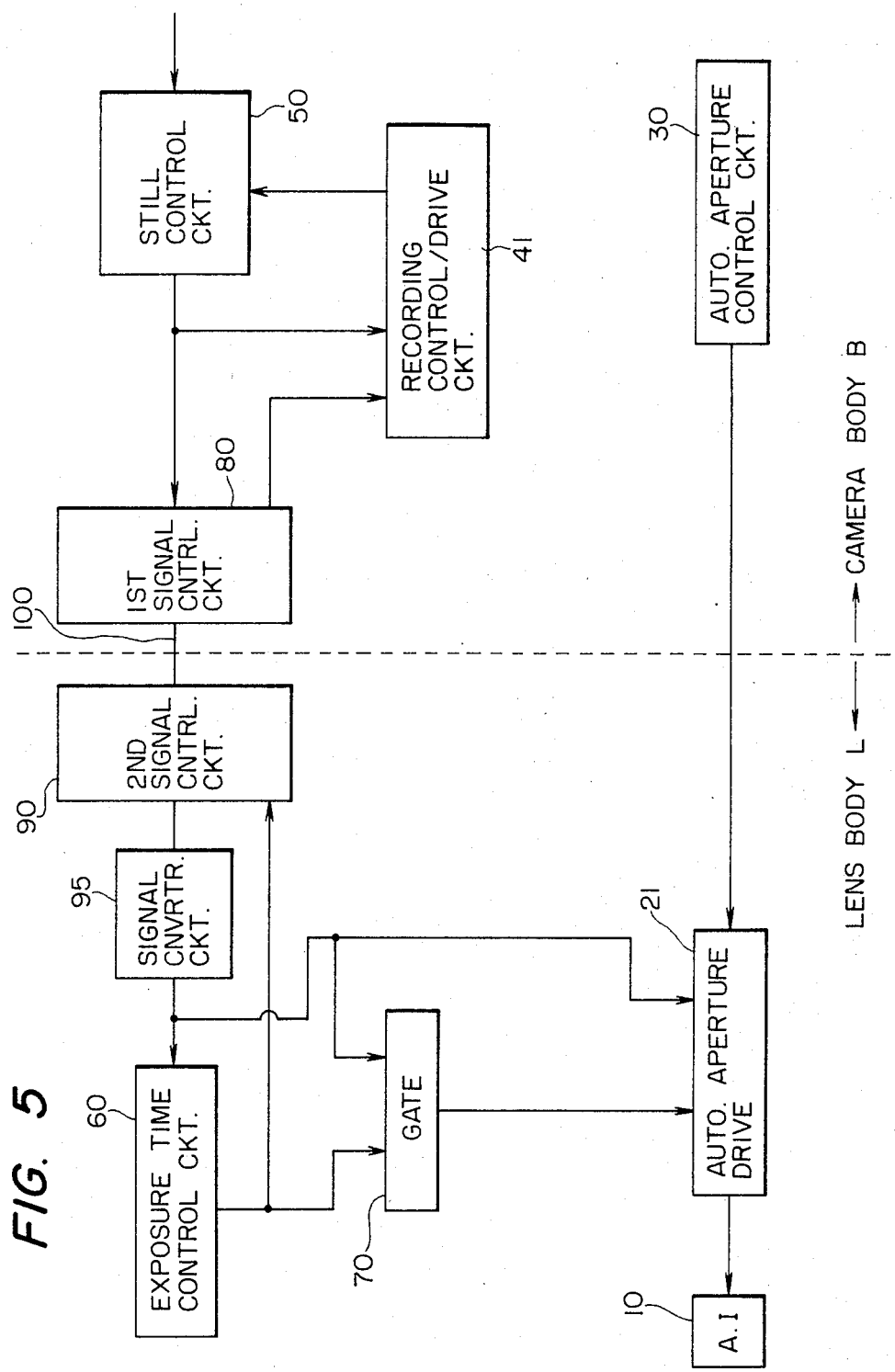
FIG. 5 is a block diagram of a second embodiment of a video camera of the invention.

FIG. 5 is a circuit diagram showing the manner in which the number of signal lines connecting the lens and camera bodies is reduced according to the embodiment shown in FIG. 2. The camera body B is provided with the recording control/drive circuit 41, the still control circuit 50 and a first signal control circuit 80. The lens body L is provided with the programmed exposure time control circuit 60, the gate circuit 70, a second signal control circuit 90 and a signal converter circuit 95. The lens body L and the camera body B are separable from one another.

The first and second signal control circuits 80 and 90 control the flow of a bidirectional signal, which is composed of the exposure time control signal and the still control signal. The circuits 80 and 90 are interconnected through a single signal line 100. For still picture photographing, the bidirectional signal is coupled between the camera body B and the lens body L in a time division manner.

Figure 6:
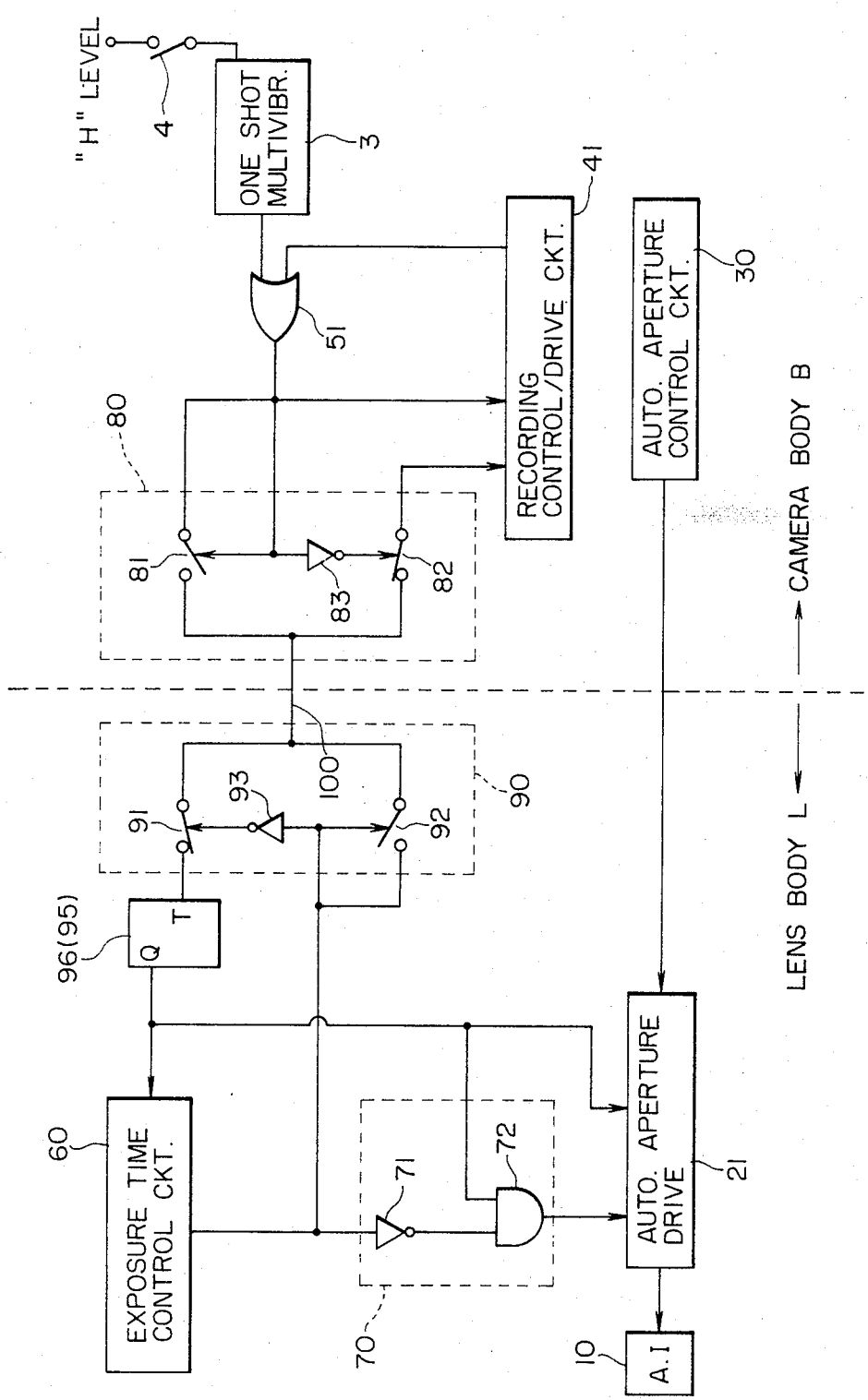
FIG. 6 is a block diagram showing in detail the preferred implementation of the video camera of FIG. 5.

FIG. 6 is a circuit diagram showing the circuit in FIG. 5 in more detail. The still control circuit 50 is implemented with an OR gate 51. A switch 4 is provided which is turned on at an initiation of the still picture mode (the switch 1 is operated in association with the release button). The switch 1 is connected through a one-shot multivibrator 3 to one input terminal of the OR gate 51, to the other input terminal of which the recording completion signal of the recording control/drive circuit 41 is applied. The recording completion signal indicates that the video signals have been recorded on the recording medium.

The first signal control circuit 80 includes switches 81 and 82 and an inverter 83. When the output signal from the OR gate 51, namely, the still control signal, is at a high logic level "H", only the switch 81 is turned on. When the still control signal is at a low logic level "L", only the switch 82 is turned on.

The second signal control circuit 90 includes switches 91 and 92 and an inverter 93. When the output signal of the programmed exposure control circuit 60, namely, the exposure time control signal, is at "L", only the switch 91 is turned on. When the exposure time control signal is at "H", only the switch 92 is turned on.

The gate circuit 70 is composed of an inverter 71 and an AND gate 72. The inverter 71 is used to invert the state of the exposure time control signal. The AND gate 72 receives the output signal of the inverter 71 and the still signal.

The operation of the above-described embodiment will be described with reference to a timing chart in FIG. 7.

When the switch 4 is open, no still signal is produced, and the AND gate 72 provides no output. Therefore, the automatic aperture drive circuit 21 is controlled only by the output signal of the automatic aperture control circuit 30, and motion picture photographing can then be carried out. When the switch 4 is turned on, the still trigger signal is produced and the one-shot multivibrator 3 produces one pulse. As a result, the OR gate 51 outputs the still control signal. In this case, the output of the OR gate is at "H", and therefore the switch 81 is turned on while the switch 82 is turned off. In this operation, no exposure time control signal is produced, and therefore the switch 91 is turned on while the switch 92 is turned off. Accordingly, the still control signal outputted by the OR gate 51 is applied through the switch 81, the signal line 100 and the switch 91 to a T-type flip-flop circuit 96 forming the signal converter 95. As a result, the flip-flop circuit 96 provides an output signal, which is the aforementioned still signal.

Thus, the programmed exposure time control circuit 60 provides no output for a predetermined period of time T1 after receiving the still signal. Therefore, the inverter 71 provides an output for the period of time T1. Accordingly, the automatic aperture shutter control signal is outputted during the period of time T1, and the automatic aperture 10 is closed by the automatic aperture control circuit 21 for the same period of time T1.

For a period of time T2 commencing following T1, the exposure time control circuit 60 generates an active output, and therefore the AND gate 72 produces no output. Accordingly, the automatic aperture 10 is opened starting from the beginning of the period of time T2. The period of time T2 is determined from the quantity of light in the image field.

When the exposure time control signal is present, the switch 92 is turned on while the switch 91 is turned off. In this operation, when the still control signal goes away, the switch 82 is turned on while the switch 81 is turned off. Accordingly, the exposure time control signal is applied through the switch 92, the signal line 100 and the switch 82 to the recording control/drive circuit 41.

When the period of time T2 has passed, the exposure time control signal disappears. Therefore, as in the period of time T1, the automatic aperture shutter control signal is outputted for a period of time T3. That is, the automatic aperture 10 is closed quickly and is maintained closed for the period of time T3. During this period, the still picture video signal is recorded on the recording medium. When the period of time T3 has passed, the recording control/drive circuit 41 outputs the recording completion signal, whereupon the still signal goes away and the still picture photographing mode of the video camera is switched over to the motion picture photographing mode. Thus, the automatic aperture 10 is controlled by the automatic aperture control circuit 30.

The exposure time control signal and the still control signal pass upon the single signal line 100 in a time division manner by utilizing the fact that they are in their active states at different times.

As is apparent from the above description, the video camera of the invention can take still pictures with various exposure times and is substantially equal in size and weight to a conventional video camera. In addition, the motion picture photographing mode can be switched over to the still picture photographing mode merely by turning on the switch 4. Thus, the video camera of the invention can be easily operated.

The video camera of the invention includes a novel circuit as described above. In order to employ the novel circuit, it is necessary to increase the number of signal lines extending between the camera body B and the lens body L. However, the number of signal lines in minimized with the use of the invention.

I claim:

1. A video camera provided with an automatic aperture and an automatic aperture drive circuit for driving said automatic aperture, comprising: a still control circuit for producing a still control signal representative of a still picture photographing operation; a programmed exposure time control circuit for producing an exposure time control signal; and a gate circuit receiving said exposure time control signal and said still signal for producing in response thereto an automatic aperture shutter control signal applied to control an automatic opening and closing operation of said automatic aperture for still picture photographing, wherein said automatic aperture is closed in response to said still signal and returned to an opened state in response to both said still signal and said exposure time control signal, and then said automatic aperture is the closed in response to disappearance of said exposure time control signal to effect a still picture photographing operation, and for photographing operations other than still picture photographing, automatic operation of said automatic aperture is carried out in accordance with the brightness of an object being photographed 2. The video camera of claim 1, wherein said still control signal has an ON state in response to a shutter release operation, and has an OFF state in response to a recording completion signal representative of the completion of a recording operation to a recording medium.

3. The video camera of claim 1, wherein said still control circuit comprises: a still control switch; and a flip-flop having a clock input coupled to said still control switch and a reset input receiving said recording completion signal, said still control signal being produced at an output of said flip-flop.

4. In a video camera capable of taking still pictures, in which a lens body thereof is provided with an automatic aperture and is separable from a camera body thereof, said automatic aperture being used as an aperture and shutter during a still picture photographing operation, wherein the improvement comprises:

said lens body comprising a programmed exposure time control circuit for producing an exposure time control signal;

said camera body comprising a still control circuit for producing a still control signal which indicates the start and finish of a still picture photographing operation;

a single signal line extending between said camera body and said lens body; and said camera body and said lens body comprising first signal control circuit and second signal control circuit means, respectively, for transmitting said exposure time control signal and said still control signal bidirectionally between said lens body and said camera body in a time division manner.

5. The video camera of claim 4, wherein said first and second signal control circuit means each comprise first and second switch means having first terminals connected to said single signal line and means for setting said first and second switch means in opposite states in response to the respective exposure time control signal and said still control signal.

* * * * *